(12) United States Patent
Miyauchi

(10) Patent No.: US 11,558,528 B2
(45) Date of Patent: Jan. 17, 2023

(54) IMAGE READING APPARATUS

(71) Applicant: SEIKO EPSON CORPORATION, Tokyo (JP)

(72) Inventor: Keisuke Miyauchi, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/650,880

(22) Filed: Feb. 14, 2022

(65) Prior Publication Data
US 2022/0166898 A1    May 26, 2022

Related U.S. Application Data

(63) Continuation of application No. 16/940,873, filed on Jul. 28, 2020, now Pat. No. 11,283,959, which is a
(Continued)

(30) Foreign Application Priority Data

Mar. 20, 2018  (JP) .............................. JP2018-052143

(51) Int. Cl.
H04N 1/12     (2006.01)
H04N 1/32     (2006.01)
(Continued)

(52) U.S. Cl.
CPC .............. *H04N 1/121* (2013.01); *B65H 7/02* (2013.01); *H04N 1/0057* (2013.01);
(Continued)

(58) Field of Classification Search
CPC ...... B65H 2801/39; B65H 7/02; B65H 1/266; B65H 2402/46; B65H 2511/214; B65H 2511/414; B65H 2511/51; B65H 7/04; B65H 2801/06; B65H 2220/01; B65H 2220/02; B65H 2402/60; B65H 3/06; B65H 3/0669; B65H 1/04; B65H 2402/31;
(Continued)

(56) References Cited

U.S. PATENT DOCUMENTS 4,727,398 A  2/1988 Honjo et al.
4,748,470 A  5/1988 Ibuchi
(Continued)

FOREIGN PATENT DOCUMENTS

CN  102014229 A  4/2011
CN  203708322 U  7/2014
(Continued)

*Primary Examiner* — Negussie Worku
(74) *Attorney, Agent, or Firm* — Global IP Counselors, LLP

(57) ABSTRACT

An image reading apparatus includes a main body, a touch panel, a document transport path, a feed tray, a feed roller, a separation unit, a reader, a discharge roller, a discharge tray, and a mounting table. The mounting table is provided on an upper side of the main body and includes an upper surface. The mounting table is located at an outer face of the main body, the upper surface serves as a mounting surface on which the source document to be fed or the source document that has been read is mounted. The mounting surface is located at a position higher than an upstream end of the feed tray when the source document is mounted on the mounting surface.

12 Claims, 15 Drawing Sheets

Related U.S. Application Data continuation of application No. 16/356,027, filed on Mar. 18, 2019, now Pat. No. 10,764,462.

(51) Int. Cl.
*H04N 1/00* (2006.01)
*B65H 7/02* (2006.01)

(52) U.S. Cl.
CPC ..... *H04N 1/00525* (2013.01); *H04N 1/32101* (2013.01); *B65H 2801/39* (2013.01); *H04N 2201/0096* (2013.01); *H04N 2201/04* (2013.01)

(58) Field of Classification Search
CPC ........ B65H 2402/54; B65H 2404/1341; B65H 2405/1111; B65H 2405/1114; B65H 2601/324; B65H 2601/325; B65H 2801/03; B65H 3/5215; B65H 3/5223; B65H 31/02; B65H 5/06; B65H 5/062; B65H 5/068; B65H 7/06; B65H 7/08; B65H 7/20; B65H 2301/4212; B65H 2301/51214; B65H 2301/5122; B65H 2301/51256; B65H 2403/40; B65H 2403/80; B65H 2404/1115; B65H 2404/132; B65H 2404/1415; B65H 2404/147; B65H 2404/15; B65H 2404/16; B65H 2515/81; B65H 2601/524; B65H 29/125; B65H 29/14; B65H 29/70; B65H 3/52; H04N 1/00525; H04N 1/0057; H04N 1/121; H04N 1/32101; H04N 2201/0096; H04N 2201/04; H04N 1/00588; H04N 1/00718; H04N 1/00734; H04N 1/00745; H04N 1/00755; H04N 1/00777; H04N 1/04; H04N 1/047; H04N 1/12; H04N 1/193; H04N 2201/0081; H04N 2201/0094; H04N 1/00384; H04N 1/00408; H04N 1/00496; H04N 1/00527; H04N 1/00535; H04N 1/00572; H04N 1/00578; H04N 1/0058; H04N 1/00602; H04N 1/00615; H04N 1/0062; H04N 1/00631; H04N 1/0464; H04N 2201/0091; H04N 2201/0093; G03G 15/602; G03G 15/6529; G03G 15/5008; G03G 15/607; G03G 15/6552; G03G 2215/00421; G03G 15/5016
USPC ......................................................... 358/498
See application file for complete search history.

(56) References Cited

U.S. PATENT DOCUMENTS

| | | |
|---|---|---|
| 4,903,077 A | 2/1990 | Oushiden et al. |
| 4,942,346 A | 7/1990 | Ardit et al. |
| 5,713,568 A | 2/1998 | Tamehira |
| 6,427,997 B1 | 8/2002 | Hirota et al. |
| 7,756,434 B2 * | 7/2010 | Murata .............. G03G 15/2039 399/70 |
| 9,479,668 B2 | 10/2016 | Kozaki |
| 10,530,951 B2 | 1/2020 | Miyauchi et al. |
| 11,165,917 B2 * | 11/2021 | Ishihara ............. H04N 1/00824 |
| 11,283,959 B2 * | 3/2022 | Miyauchi ................. B65H 7/02 |
| 2005/0196214 A1 | 9/2005 | Ishikawa et al. |
| 2007/0047010 A1 | 3/2007 | Takemoto |
| 2007/0188818 A1 * | 8/2007 | Westcott ............ H04N 1/00583 358/296 |
| 2009/0046252 A1 | 2/2009 | Heym et al. |
| 2010/0247138 A1 | 9/2010 | Kikuchi et al. |
| 2011/0058233 A1 | 3/2011 | Oshima |
| 2013/0163056 A1 | 6/2013 | Hanayama |
| 2014/0009550 A1 | 1/2014 | Togo et al. |
| 2014/0191466 A1 | 7/2014 | Yokote |
| 2014/0291927 A1 | 10/2014 | Nakahata et al. |
| 2015/0183607 A1 | 7/2015 | Nakahata et al. |
| 2015/0192890 A1 | 7/2015 | Kikuchi et al. |
| 2016/0028915 A1 | 1/2016 | Kozaki |
| 2016/0052303 A1 | 2/2016 | Aoki |
| 2016/0279979 A1 | 9/2016 | Kohama |
| 2017/0107072 A1 | 4/2017 | Nakamura |
| 2017/0137241 A1 | 5/2017 | Okumura et al. |
| 2018/0041652 A1 * | 2/2018 | Miyauchi ............. G03G 15/602 |
| 2018/0079229 A1 | 3/2018 | Kodama et al. |
| 2018/0198943 A1 * | 7/2018 | Yoshi ..................... H04N 1/047 |
| 2019/0119058 A1 | 4/2019 | Chiba |
| 2019/0132455 A1 | 5/2019 | Miyauchi et al. |
| 2019/0132464 A1 * | 5/2019 | Miyauchi ........... H04N 1/00602 |
| 2019/0297215 A1 * | 9/2019 | Miyauchi ........... H04N 1/00525 |
| 2020/0130972 A1 | 4/2020 | Miyauchi et al. |
| 2021/0127028 A1 | 4/2021 | Ishihara |

FOREIGN PATENT DOCUMENTS

| | | |
|---|---|---|
| CN | 104071622 A | 10/2014 |
| JP | 2002-274738 A | 9/2002 |
| JP | 2009-096583 A | 5/2009 |
| JP | 2009-527143 A | 7/2009 |
| JP | 2011-066762 A | 3/2011 |
| JP | 2014-086819 A | 5/2014 |
| JP | 6190543 B2 | 8/2017 |
| JP | 2017-178588 A | 10/2017 |
| JP | 2019-083428 A | 5/2019 |
| JP | 2019-083429 A | 5/2019 |
| TW | M488155 U | 10/2014 |

* cited by examiner

IMAGE READING APPARATUS

CROSS-REFERENCE TO RELATED APPLICATIONS

This Application is a continuation application of U.S. patent application Ser. No. 16/940,873 filed on Jul. 28, 2020, which is a continuation application of U.S. patent application Ser. No. 16/356,027 filed on Mar. 18, 2019, now U.S. Pat. No. 10,764,462. This application claims priority to Japanese Patent Application No. 2018-052143, filed Mar. 20, 2018. The entire disclosures of U.S. patent application Ser. Nos. 16/940,873 and 16/356,027, and Japanese Patent Application No. 2018-052143 are expressly incorporated by reference herein.

BACKGROUND

1. Technical Field

The present invention relates to an image reading apparatus that performs reading on a medium.

2. Related Art

Some of image reading apparatuses, typically exemplified by a scanner, include an auto document feeder (ADF) that automatically feeds a source document, an example of a medium, to automatically feed and read a plurality of sheets of the source document.

Some of such image reading apparatuses include a casing having an upper face formed as an obliquely inclined surface, as described in JP-A-2014-86819. The image reading apparatus according to JP-A-2014-86819 includes a first supporter that supports the casing in a first position, in which a sheet transport path is inclined with respect to a horizontal direction, and a second supporter that supports the casing in a second position, in which the sheet transport path is oriented closer to the horizontal direction, than in the first position.

In the first position, in which the casing is supported by the first supporter, the sheet transport path is inclined with respect to the horizontal direction, and therefore an increase in size of the apparatus can be suppressed. In the second position, in which the casing is supported by the second supporter, the sheet transport path is oriented closer to the horizontal direction than in the first position, the leading edge of a sheet can be prevented from colliding with, for example, the floor surface on which the image reading apparatus is installed, when the sheet is a stiff sheet and is discharged.

Whereas the image reading apparatus configured to change the installation posture is known, still there is a room for improvement in the following aspects. Referring to FIG. 15, those aspects will be described hereunder. FIG. 15 illustrates a motion line of a user's hand, when a large document stack Pb is placed behind an image reading apparatus 100 (on the right in FIG. 15) and the user sets the source document on a feed tray 101 one by one from the uppermost sheet of the document stack Pb while confirming each time the content of the source document. In FIG. 15, a broken line S indicates the transport path of the source document to be read. A reference numeral 103 denotes a discharge tray that receives the source document that has been discharged, and a reference character G denotes an installation base on which the image reading apparatus 100 is installed.

When the user sets the source document as above, the motion line U1 of the user's hand may be prolonged depending on the location of the document stack Pb, and thus the work efficiency may be deteriorated. In addition, the space for placing the document stack Pb has to be ensured behind the image reading apparatus 100.

SUMMARY

An image reading apparatus includes a main body, a touch panel, a document transport path, a feed tray, a feed roller, a separation unit, a reader, a discharge roller, a discharge tray, and a mounting table. The touch panel is provided on an upper side of the main body and operates execution of image reading. The document transport path is provided in the main body and in which a source document is transported in a transport direction. The feed tray is located at an upstream end of the document transport path in the transport direction and supports a source document to be fed. The feed roller is provided downstream of the feed tray in the transport direction and feeds the source document supported on the feed tray. The separation unit provided downstream of the feed tray in the transport direction and separates the source document that has been fed by the feed roller. The reader is provided downstream of the separation unit in the transport direction and performs reading on the source document that has been separated by the separation unit. The discharge roller is provided downstream of the reader in the transport direction and discharges the source document that has been read by the reader. The discharge tray is located at a downstream end of the document transport path in the transport direction and provided downstream of the reader in the transport direction and receives the source document that has been discharged. The mounting table is provided on an upper side of the main body and includes an upper surface, the mounting table being located at an outer face of the main body, the upper surface serves as a mounting surface on which the source document to be fed or the source document that has been read is mounted, the mounting surface being located at a position higher than an upstream end of the feed tray when the source document is mounted on the mounting surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
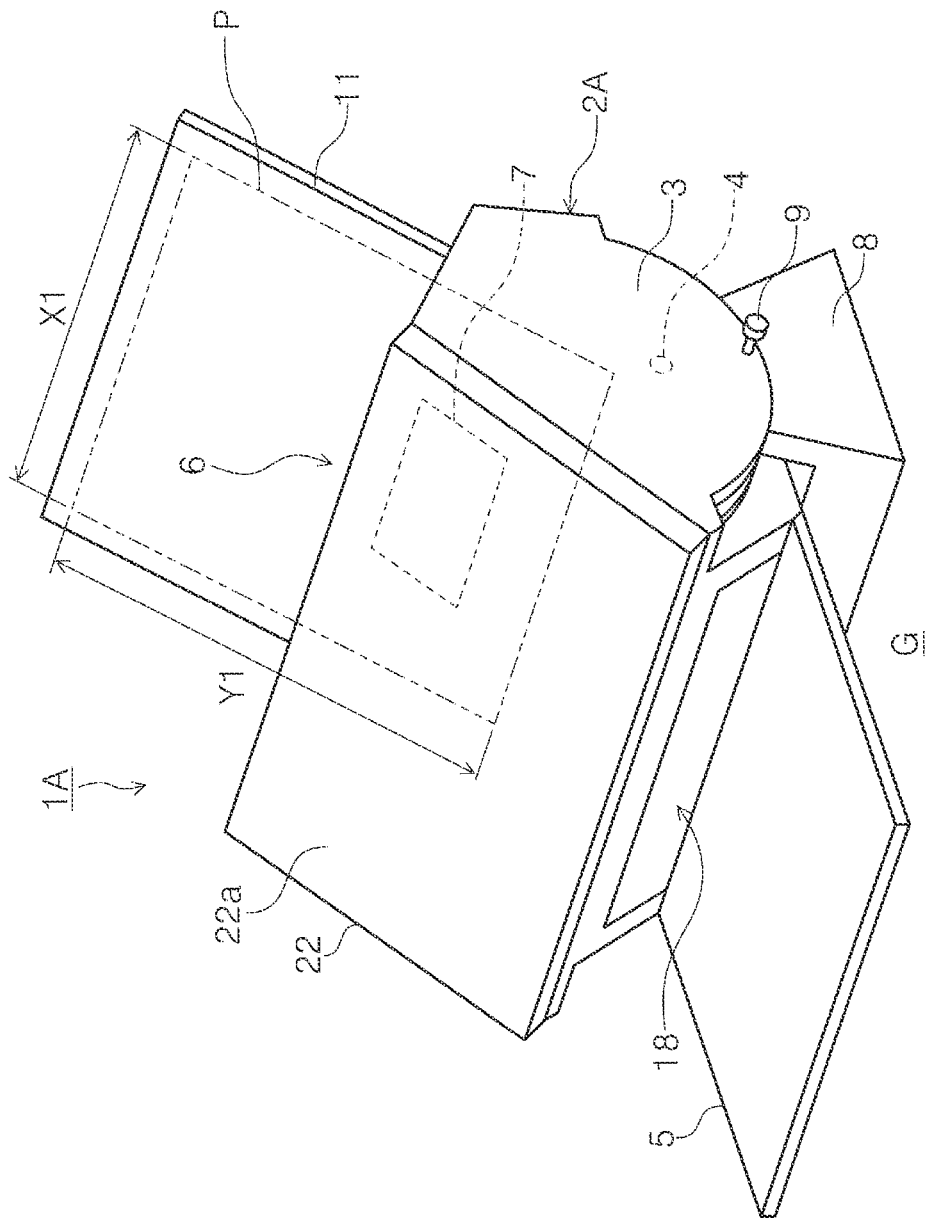
FIG. 1 is a perspective view illustrating an appearance of a scanner according to a first embodiment of the invention.

Hereafter, embodiments of the invention will be described with reference to the drawings. In each of the embodiments, the same element will be given the same numeral, and described only in the first one of the embodiments that include the element. In the subsequent embodiments, the description of such element will not be repeated.

Referring to FIG. 1 to FIG. 6, an image reading apparatus according to a first embodiment of the invention will be described. A reference numeral 1A denotes a scanner exemplifying the image reading apparatus according to the first embodiment of the invention.

In FIG. 1, the scanner 1A includes a document feed tray 11 exemplifying the medium support section configured to support a source document exemplifying the medium (hereinafter, source document P) to be fed, and located on a rear side of a main body 2A including reading units 20a and 20b (see FIG. 2) that read the image on the source document P, and a discharge tray 5 configured to receive the source document P read and discharged, and located on a front side of the main body 2A.

The main body 2A includes an operation panel 7, located on the upper face and configured to function as a user interface (UI) for inputting settings and execution instructions for reading, as well as displaying the detail of the setting. In this embodiment, the operation panel 7 is a touch panel based on electrostatic capacitance configured to both display and receive inputs, in other words, serves as an operation unit for executing various operations, as well as a display unit for displaying various types of information.

An inlet port 6 is provided on the rear side of the main body 2A so that the source document P mounted on the document feed tray 11 is fed through the inlet port 6 toward the reading units 20a and 20b inside the main body 2A.

A discharge port 18 is provided on the front side of the main body 2A so that the source document P that has been read is discharged to the discharge tray 5 through the discharge port 18.

Figure 2:
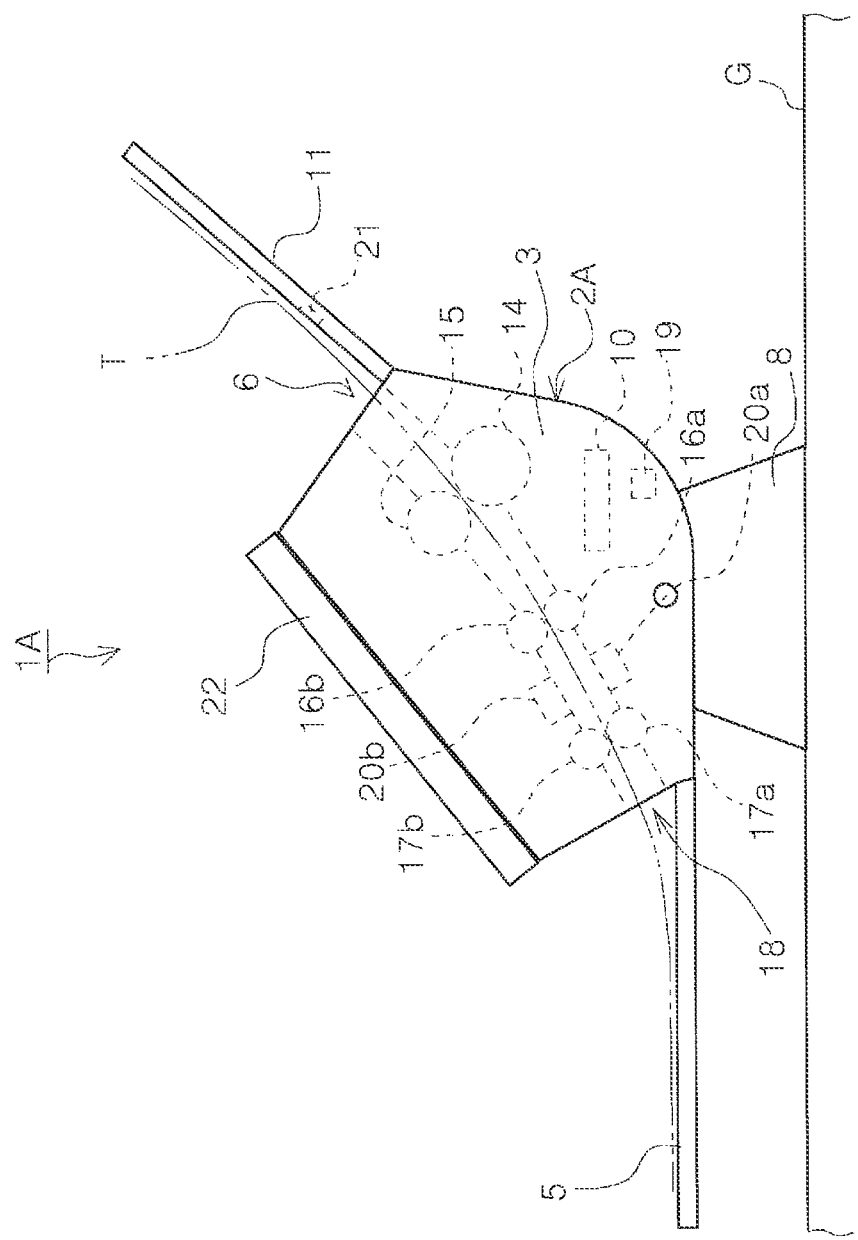
FIG. 2 is a side sectional view illustrating a document transport path in the scanner according to the first embodiment of the invention.

As illustrated in FIG. 2, a document transport path T is provided inside the main body 2A. The document feed tray 11 is located at the upstream end of the document transport path T. Downstream of the document feed tray 11, provided are a feed roller 14 that feeds the source document P mounted on the document feed tray 11 to the reading units 20a and 20b, and a separation roller 15 that nips the source document P in collaboration with the feed roller 14 to thereby separate the source document P.

The feed roller 14 contacts a lowermost one of source documents P mounted on the document feed tray 11. Accordingly, when a source document P including a plurality of sheets is set on the document feed tray 11 in the scanner 1A, the sheets of the source document P are sequentially fed to the downstream side, from the lowermost one.

In addition, a mounting sensor 21 exemplifying the medium detector is provided on the document feed tray 11 to detect whether a source document P is present on the document feed tray 11.

A transport drive roller 16a and a transport slave roller 16b are provided downstream of the feed roller 14 so that the source document P fed by these rollers are transported to the region between the reading units 20a and 20b.

The reading units 20a and 20b are located so as to oppose each other across the document transport path T so that one or both of the faces of the source document P are read by the reading units 20a and 20b. In this embodiment, the reading units 20a and 20b are constituted, for example, as a contact image sensor module (CISM).

The source document P, one or both of the faces of which have been read by the reading units 20a and 20b, is nipped between a discharge drive roller 17a and a discharge slave roller 17b located downstream of the reading units 20a and 20b, and discharged through the discharge port 18.

The main body 2A is supported by a pedestal 8 via a pivotal shaft 4 as illustrated in FIG. 1 so that the posture of the main body 2A with respect to an installation base G on which the scanner 1 is installed is adjusted by pivoting about the pivotal shaft 4. The installation base G is a horizontal surface. The posture of the main body 2A with respect to the pedestal 8 is fixed by a fixing screw 9. Although FIG. 1 illustrates the pivotal shaft 4 and the fixing screw 9 only on the right side of the main body 2A, the pivotal shaft 4 and the fixing screw 9 are provided on both sides thereof.

Figure 3:
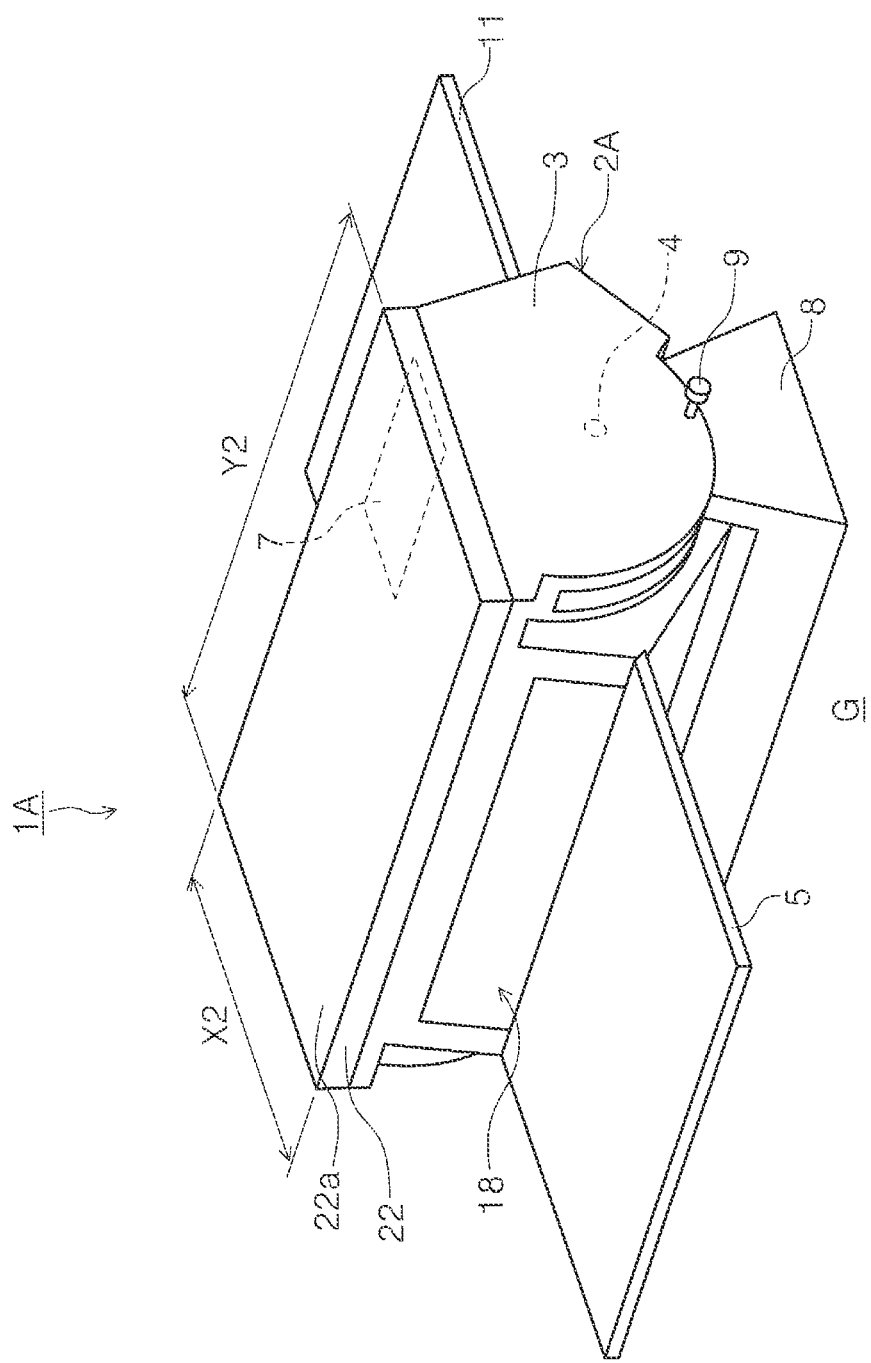
FIG. 3 is another perspective view illustrating an appearance of the scanner according to the first embodiment of the invention.
Figure 4:
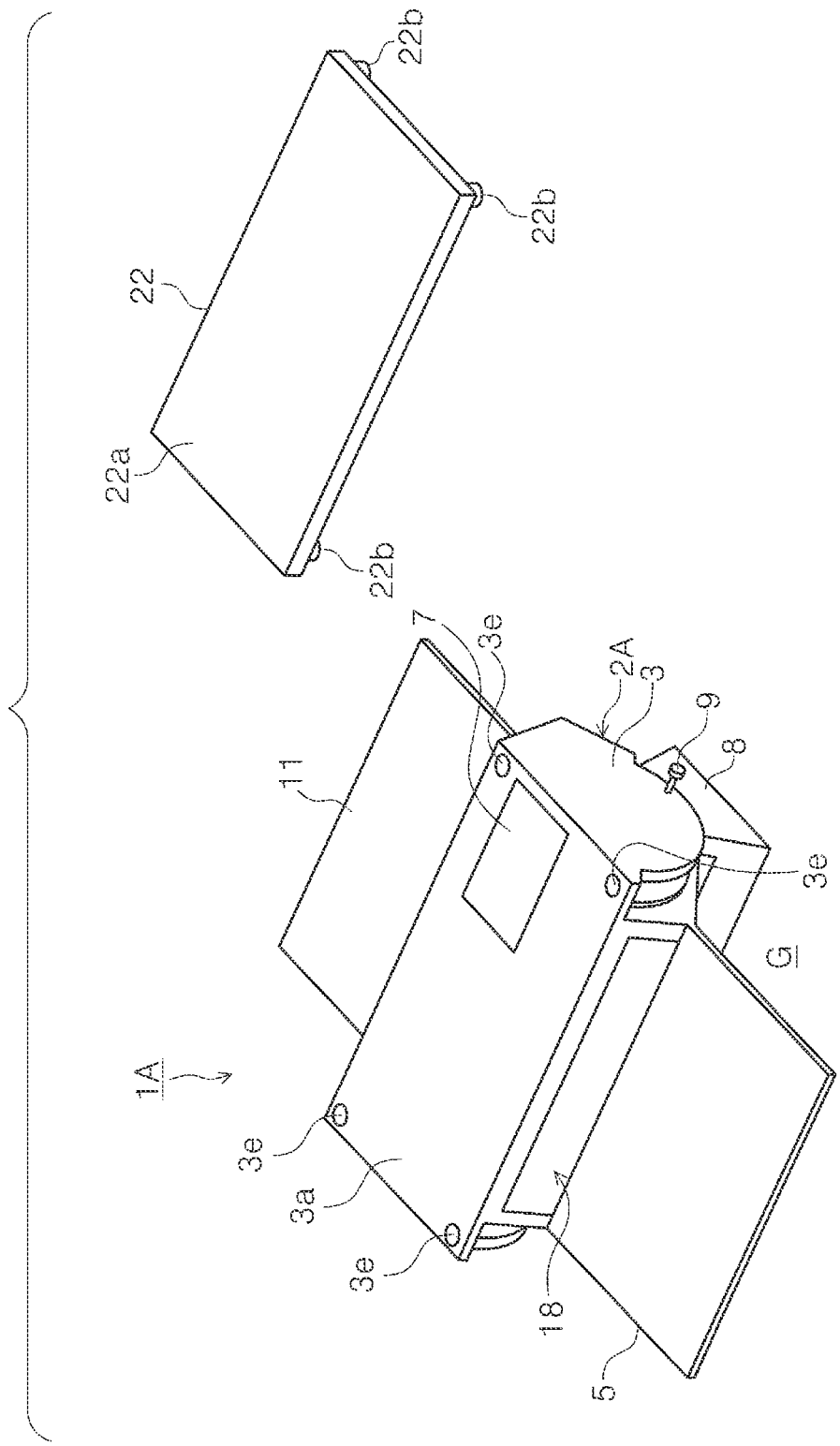
FIG. 4 is an exploded perspective view of the scanner according to the first embodiment of the invention.
Figure 5:
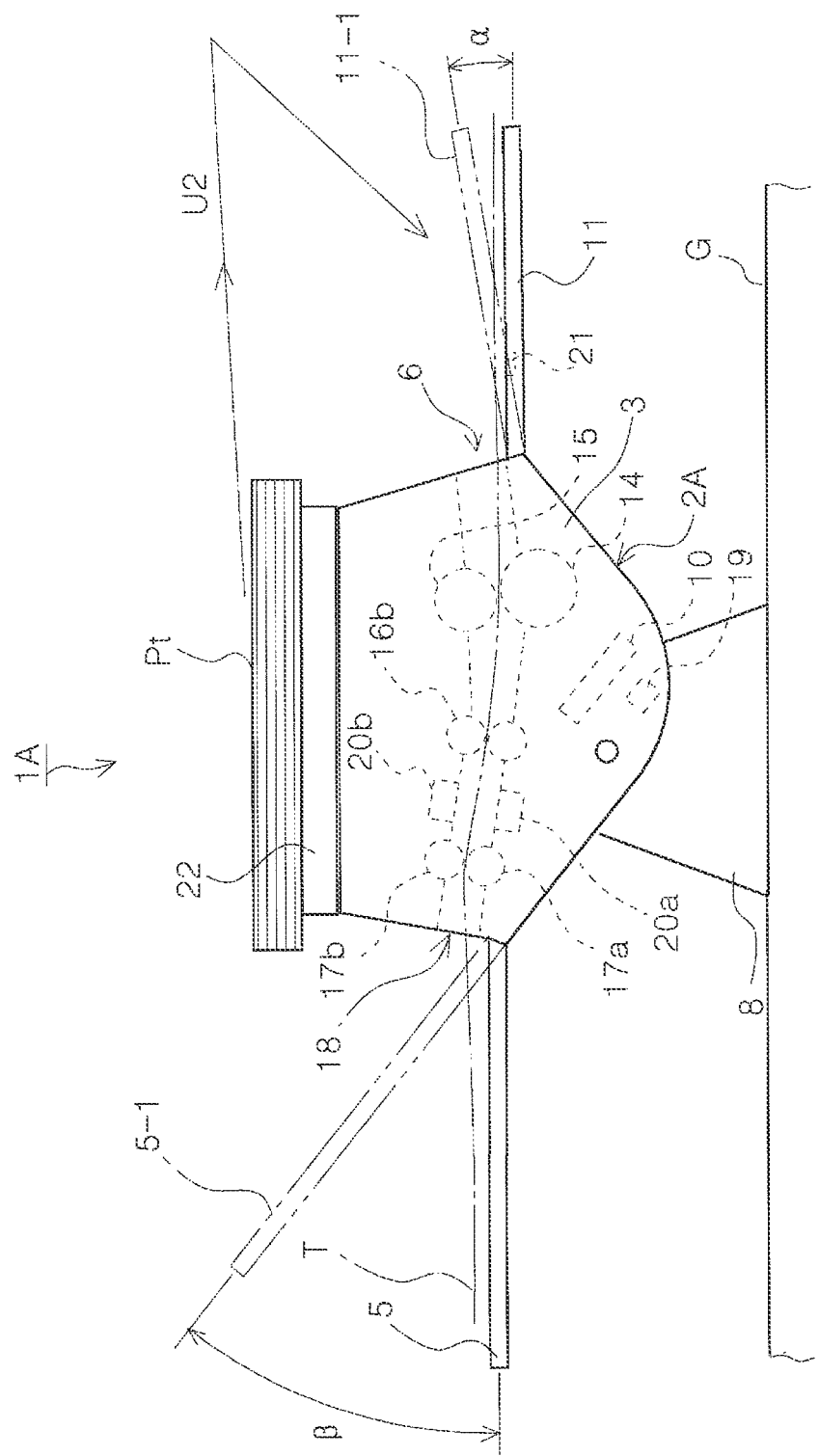
FIG. 5 is another side sectional view illustrating a document transport path in the scanner according to the first embodiment of the invention.

FIG. 1 and FIG. 2 illustrate the state where the main body 2A assumes an inclined posture, while FIG. 3 to FIG. 5 illustrate the state where the main body 2A assumes a horizontal posture. Here, the inclined posture refers to a posture in which a mounting surface 22a of a mounting table 22, to be subsequently described, is inclined with respect to the installation base G (horizontal surface), and the horizontal posture refers to a posture in which the mounting surface 22a is parallel to the installation base G (horizontal surface).

The main body 2A includes a posture sensor 19 (see FIG. 2) exemplifying the posture detector, and a control unit 10 (see FIG. 2) exemplifying the controller that controls the operations of the scanner 1A. The control unit 10 recognizes the posture of the main body 2A based on a detection signal received from the posture sensor 19 and performs a necessary control as the case may be.

In this embodiment, the document feed tray 11 and the discharge tray 5 are configured to switch between postures with respect to the main body 2A as illustrated in FIG. 5. More specifically, the document feed tray 11 is configured to swing about a downstream edge (not shown), and the discharge tray 5 is configured to swing about an upstream edge (not shown). Accordingly, the posture of the document feed tray 11 is adjustable within an angular range α in FIG. 5, and the posture of the discharge tray 5 is adjustable within an angular range β in FIG. 5. In FIG. 5, a reference numeral 11-1 denotes the document feed tray in a posture before being switched, and a reference numeral 5-1 denotes the discharge tray in a posture before being switched. The posture of each of the trays can be retained by various methods, for example, by utilizing friction force or by fitting between a projection and a recess.

Accordingly, for example, when the main body 2A is set to the horizontal posture as illustrated in FIG. 5, the document feed tray 11 and the discharge tray 5 can both be set to the horizontal posture. Therefore, the work efficiency in setting the source document P on the document feed tray 11 and picking up the source document P from the discharge tray 5 can be improved, and also sheets of the source document P discharged through the discharge port 18 can be more smoothly stacked.

Hereunder, the mounting table 22 exemplifying the mounting section provided on the upper face of the main body 2A will be described. In this embodiment, the mounting table 22 has a rectangular shape, the upper surface of which serves as the mounting surface 22a for mounting thereon the source document P yet to be fed, or the source document P that has been read. Whereas the mounting table 22 may be formed of various materials, it is preferable that the mounting surface 22a provides relatively high friction force with respect to the source document P to prevent the source document P from slipping off when mounted on the mounting surface 22a. In this case, the mounting table 22 may be formed of a high-friction material (e.g., an elastomer such as rubber) as a whole, or only the mounting surface 22a may be formed of a high-friction material. Alternatively, instead of employing a high-friction material to form the mounting surface 22a, an anti-slipping treatment may be applied to the mounting surface 22a so as to increase the friction force.

The mounting table 22 is removably attached to the main body 2A in this embodiment, and FIG. 1 to FIG. 3 illustrate the mounting table 22 attached to the main body 2A, while FIG. 4 illustrates the mounting table 22 removed from the main body 2A. Providing thus the mounting table 22 as a removable element contributes to reducing the overall size of the apparatus, when the mounting table 22 is not in use. In addition, in the case where the operation panel 7 is provided on the upper face of the main body 2A as in this embodiment, the operation panel 7 can be accessed when the mounting table 22 is removed.

Referring to FIG. 4, the upper face 3a of the casing 3 constituting the outer shell of the main body 2A is formed generally as a planar surface, and a fitting recess 3e is formed at each of the four corners. A fitting projection 22b is formed at each of the four corners of the lower surface of the mounting table 22, and when the fitting projections 22b are fitted in the respective fitting recesses 3e, the mounting table 22 is positioned with respect to the main body 2A.

Here, it is not necessarily the fitting projections 22b and the fitting recesses 3e being formed so as to be fitted with a certain pressing force, but it suffices that the mounting table 22 is prevented from slipping off from the casing 3, when the main body 2A assumes the inclined posture as illustrated in FIG. 1. However, it is preferable to form the fitting projections 22b and the fitting recesses 3e requiring a certain pressing force to achieve the fitting, because in this case the backlash of the mounting table 22 can be prevented. It is also preferable, from such a viewpoint, to form at least one of the fitting projection 22b and the fitting recess 3e from an elastic material so that the fitting therebetween is achieved via elastic deformation.

The mounting table 22 attached to the outer face of the casing 3 constituting the outer shell of the main body 2A is formed in a size that can receive the source document P to be set on the document feed tray 11. Accordingly, the user can set the source document P to be fed along an extremely short motion line of the hand, and therefore the work efficiency can be improved. As an additional advantage, it is no longer necessary to ensure a space for placing the source document P to be set, around the apparatus.

In FIG. 5, a reference character Pt denotes the document stack mounted on the mounting table 22, and a reference character U2 denotes the motion line of the user's hand, when setting the source document P on the document feed tray 11, out of the document stack Pt on the mounting table 22. Employing the mounting table 22 enables the motion line U2 to be significantly shortened.

The size of the mounting table 22 will be described in further detail hereunder. In FIG. 1, a length X1 represents a maximum size that can be inserted in the inlet port 6, and a length X2 in FIG. 3 represents the short side length of the mounting table 22. A length Y1 in FIG. 1 represents the long side length of a sheet, stipulated to have a short side length corresponding to the length X1, and a length Y2 in FIG. 3 represents the long side length of the mounting table 22.

For example, the size A4 according to ISO 216 may be adopted as the sheet stipulated to have a short side length of X1 and a long side length of Y1. In this case, the length Y1 is 297 mm, and the length X1 is 210 mm. This size corresponds to the largest size of the sheet that can be set on the scanner 1 to be fed and read.

To stably mount on the mounting table 22 the source document P to be set on the document feed tray 11, it is preferable that the length X2 is longer than the length X1, and the length Y2 is longer than the length Y1. However, it is not mandatory to satisfy such a condition, provided that the source document P is prevented from falling off from the mounting table 22. Such a size can be determined as desired, by persons skilled in the art.

Figure 6:
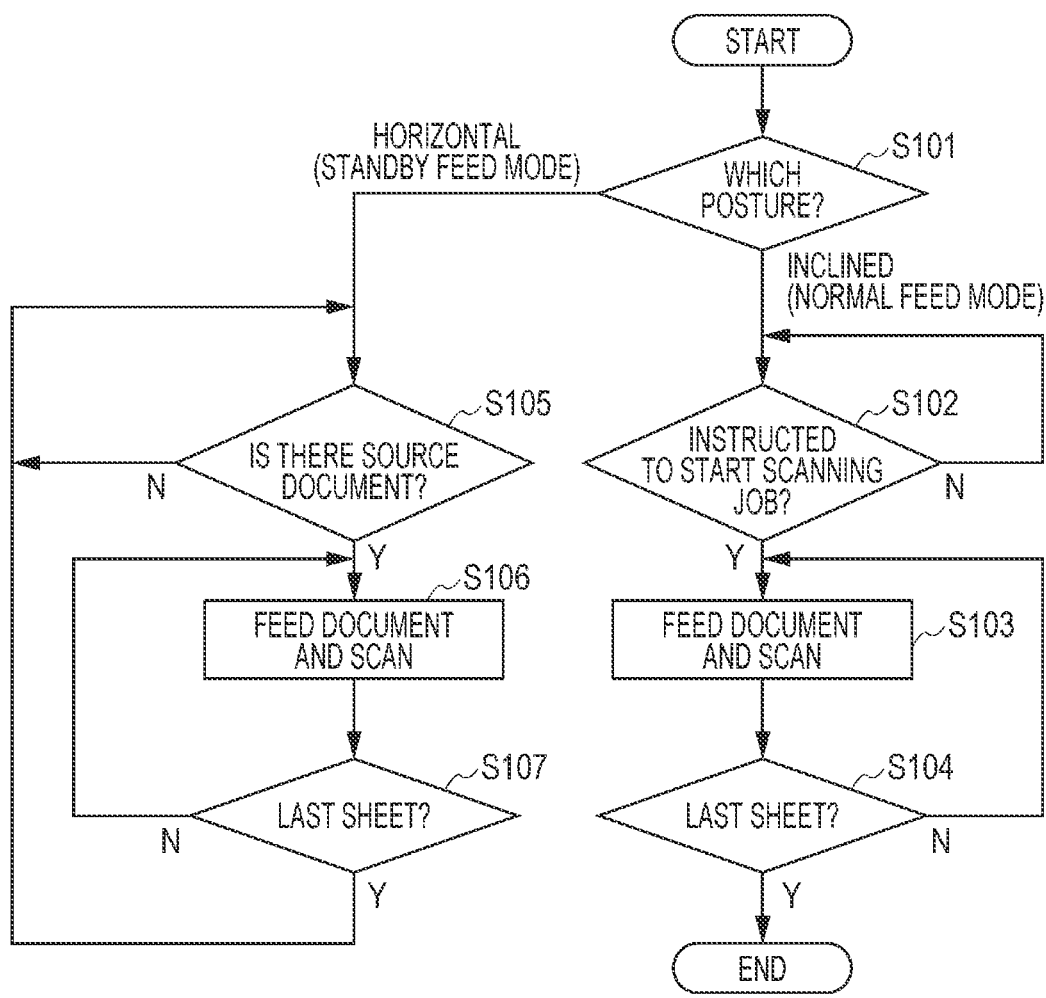
FIG. 6 is a flowchart illustrating a feed control process for the scanner according to the first embodiment of the invention.

Referring now to FIG. 6, feed modes of the scanner 1 will be described hereunder. The control unit 10 (see FIG. 2) decides whether the main body is in the inclined posture (FIG. 1 and FIG. 2) or in the horizontal posture (FIG. 3 to FIG. 5), based on a detection signal received from the posture sensor 19 (see FIG. 2) (step S101), and switches between the feed modes depending on the posture.

Specifically, upon deciding at step S101 that the main body is in the inclined posture, the control unit 10 selects a normal feed mode. In the normal feed mode, when an instruction to start a scanning job is received (Y at step S102), the control unit 10 feeds and scans the document (step S103). When the control unit 10 decides that the last sheet of the source document P on the document feed tray 11 has been fed (Y at step S104), based on a detection signal received from the mounting sensor 21 (see FIG. 2), the control unit 10 finishes the job.

In contrast, upon deciding that the main body is in the horizontal posture, the control unit 10 selects a standby feed mode. In the standby feed mode, the control unit 10 feeds and scans the document (step S106) upon deciding that the source document P is mounted on the document feed tray 11, based on a detection signal received from the mounting sensor 21. However, the control unit 10 does not finish the feed job, despite deciding that the last sheet of the source document P on the document feed tray 11 has been fed (Y at step S107), based on a detection signal received from the mounting sensor 21 (see FIG. 2), but temporarily suspends the feed job until a next source document P is mounted on the document feed tray 11 (N at step S105). Then upon detecting that a source document P has been mounted on the document feed tray 11, based on a detection signal received from the mounting sensor 21 (Y at step S105), the control unit 10 again feeds and scans the document (step S106).

The above arrangement eliminates the need to operate the operation panel 7 each time, when repeating the process of picking up the source document P from the document stack Pt on the mounting table 22 and setting the source document P on the document feed tray 11, as indicated by the motion line U2 in FIG. 5. Therefore, the user-friendliness of the scanner 1 can be improved.

Here, instead of selecting the feed mode based on the posture of the main body, a sensor for detecting whether a source document P is present on the mounting table 22 may be provided, to thereby select the normal feed mode when there is no source document P on the mounting table 22, and select the standby feed mode when there is a source document P on the mounting table 22.

To detect whether a source document is on the mounting table 22, for example, an optical sensor or pressure sensor may be employed.

Figure 7:
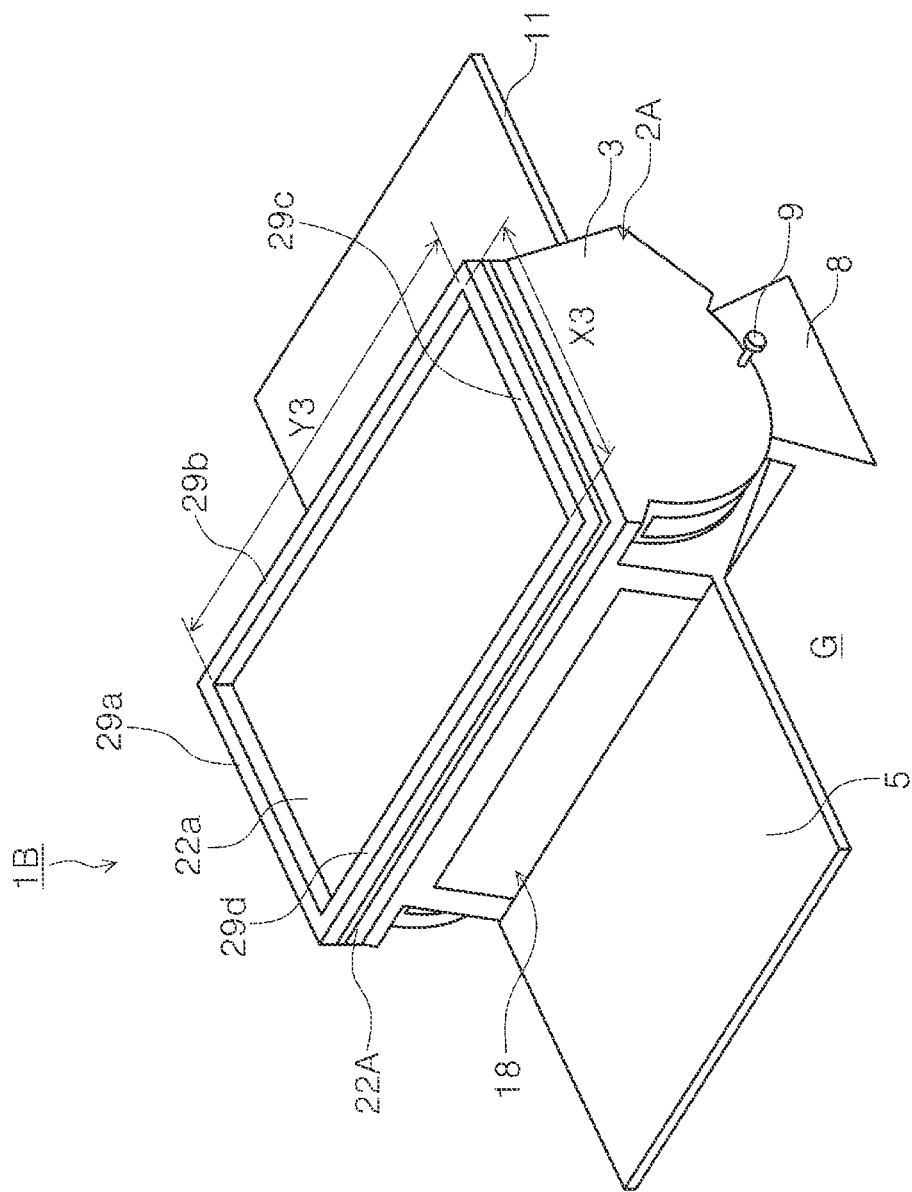
FIG. 7 is a perspective view illustrating a scanner according to a second embodiment of the invention.

Referring to FIG. 7 and the subsequent drawings, other embodiments will be described hereunder. In FIG. 7 and the subsequent drawings, as mentioned above, the same elements are given the same numeral, and the description thereof will not be repeated.

A scanner 1B according to a second embodiment illustrated in FIG. 7 includes a mounting table 22A. Unlike the mounting table 22 described with reference to FIG. 1 to FIG. 5, the mounting table 22A includes wall portions 29a, 29b, 29c, and 29d, formed on the upper face. The wall portions 29a to 29d are located so as to oppose the respective sides of the source document P mounted on the mounting table 22A. Such a configuration prevents or suppress slipping off of the source document P from the mounting table 22A.

Although the wall portions are provided on all the four sides of the mounting table 22A in FIG. 7, the wall portion may be provided on at least one of the sides thereof. In this case, the document P can be prevented or restricted from slipping off from the mounting section in a direction toward the wall portion.

In FIG. 7, lengths X3 and Y3 represent the length of the region surrounded by the wall portions 29a to 29d. It is preferable that, like the lengths X2 and Y2 (see FIG. 3) described above, the lengths X3 and Y3 are longer than the lengths X1 and Y1 (see FIG. 1), respectively.

Figure 8:
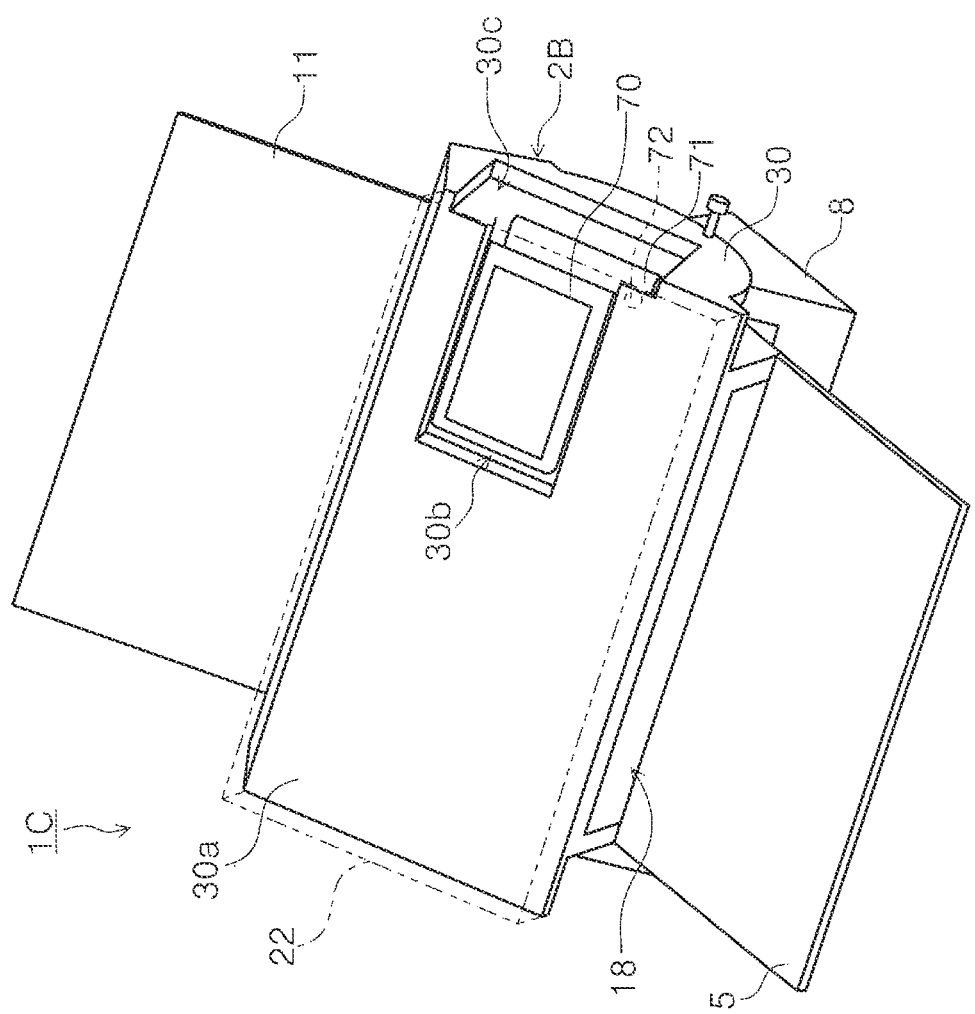
FIG. 8 is a perspective view illustrating a scanner according to a third embodiment of the invention.
Figure 9:
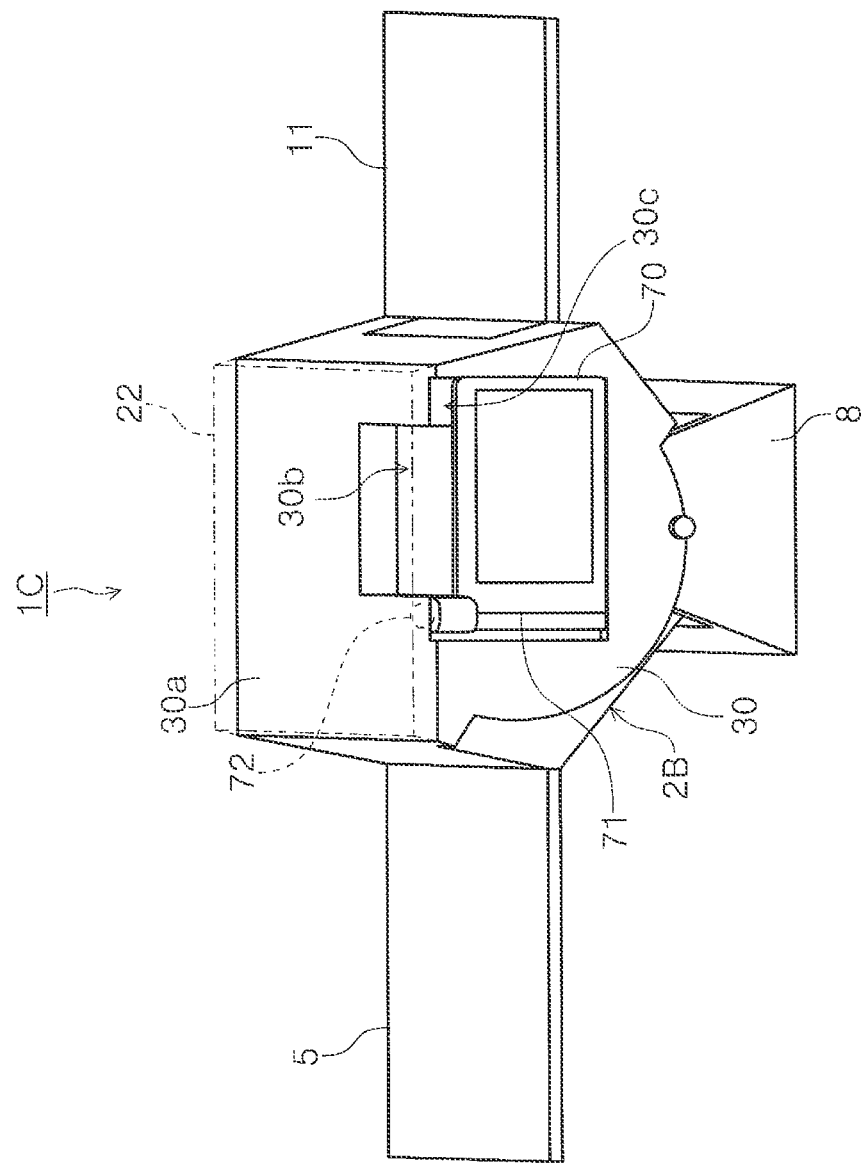
FIG. 9 is another perspective view illustrating a scanner according to the third embodiment of the invention.

A scanner 1C according to a third embodiment illustrated in FIG. 8 and FIG. 9 includes an operation panel 70 located in an upper portion of the casing 30 constituting a main body 2B. The operation panel 70 is configured to pivot about a shaft 71. The shaft 71 is attached to a ball link 72, which provides a sufficient degree of freedom in changing the posture.

The upper face 30a of the casing 30 includes a recess 30b so that the operation panel 70 can be located inside the recess 30b and does not protrude from the upper face 30a.

A recess 30c is formed on the right-side face of the casing 30, and therefore the operation panel 70 can be located inside the recess 30c as illustrated in FIG. 9, because of the degree of freedom in changing the posture provided by the shaft 71 and the ball link 72.

Thus, the position of the operation panel 70 can be switched between a first position covered with the mounting table 22 (FIG. 8) and a second position not covered with the mounting table 22 (FIG. 9). Therefore, even when the mounting table 22 is attached to the upper face of the main body 2B, setting the operation panel 70 to the second position enables the operation panel 70 to be accessed.

Here, the mounting table 22 may be excluded, and the upper face 30a of the casing 30 may be utilized as the mounting table for mounting the source document P thereon.

In other words, the casing 30 itself may serve as the mounting table 22. In this case also, since the position of the operation panel 70 can equally be switched between the first position (FIG. 8) covered with the source document P mounted on the upper face 30a of the casing 30, and the second position (FIG. 9) not covered with the source document P, the operability of the operation panel 70 can be ensured.

In the case where the source document P directly covers the upper face of the operation panel 70 as above, it is preferable to employ a touch panel based on electrostatic capacitance to constitute the operation panel 70. In this case, the touch panel can be prevented or restricted from reacting even if the source document P contacts the operation panel 70, and therefore an erroneous operation can be prevented or restricted.

The control unit 10 may invalidate an instruction inputted through the operation panel 70, when the main body assumes a posture that allows the source document P to be mounted on the mounting table 22, for example, the horizontal posture. Such an arrangement prevents the operation panel 7 from being erroneously operated, when the mounting table 22 is in use.

Further, instead of allowing the operation panel 70 to switch between the postures, the operation panel 70 may be fixed to a face other than the face on which the mounting table 22 is provided, for example, at the position (side face of the casing) illustrated in FIG. 9. In this case, the operation panel is not covered with the mounting table 22, and therefore the operability of the operation panel can be ensured.

Figure 10:
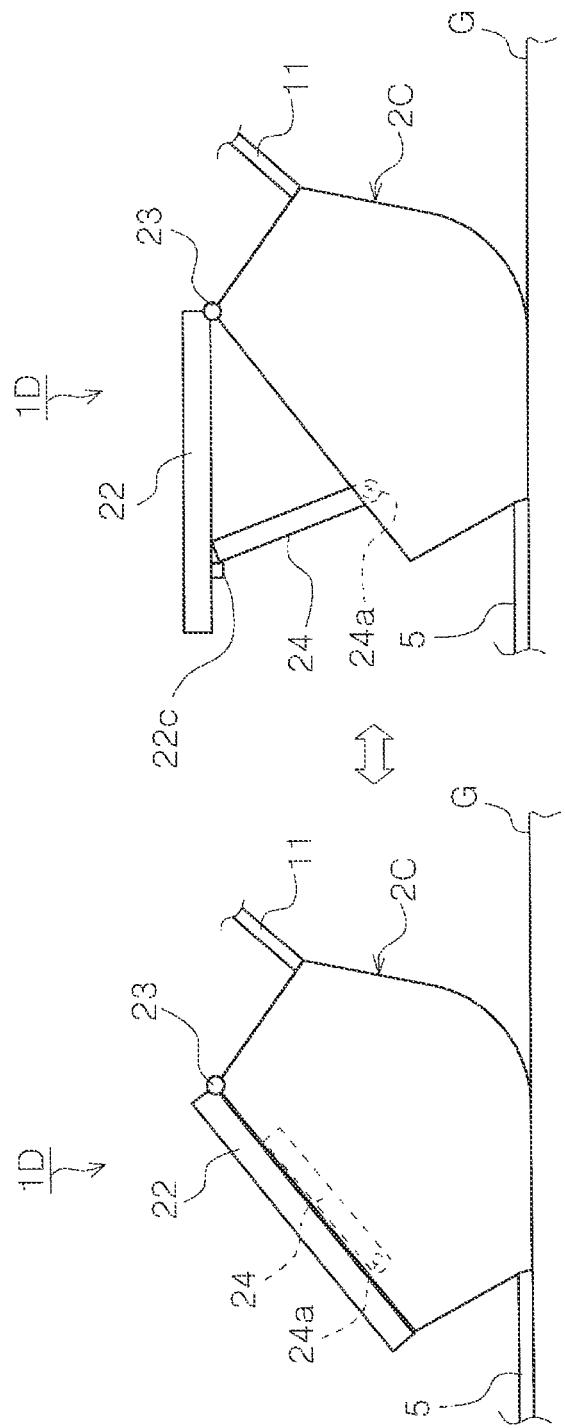
FIG. 10 includes side views each illustrating a scanner according to a fourth embodiment of the invention.

In a scanner 1D according to a fourth embodiment illustrated in FIG. 10, the mounting table 22 is attached to a main body 2C so as to pivot with respect thereto about a pivotal shaft 23. A support column 24 is attached to the main body 2C so as to pivot about a pivotal shaft 24a, and therefore when the upper face of the main body is inclined as illustrated in the drawing on the left in FIG. 10, the mounting table 22 can be maintained in the horizontal posture, as illustrated in the drawing on the right in FIG. 10, with the support column 24. A reference numeral 22c denotes an abutment to be engaged with the support column 24.

Allowing thus the mounting table 22 to switch between the postures with respect to the main body 2C enables the mounting table 22 to be set to a posture that facilitates the source document P to be mounted thereon. In addition, since the upper face of the main body 2C is exposed, the operation panel 7 (see FIG. 1) can be accessed.

Figure 11:
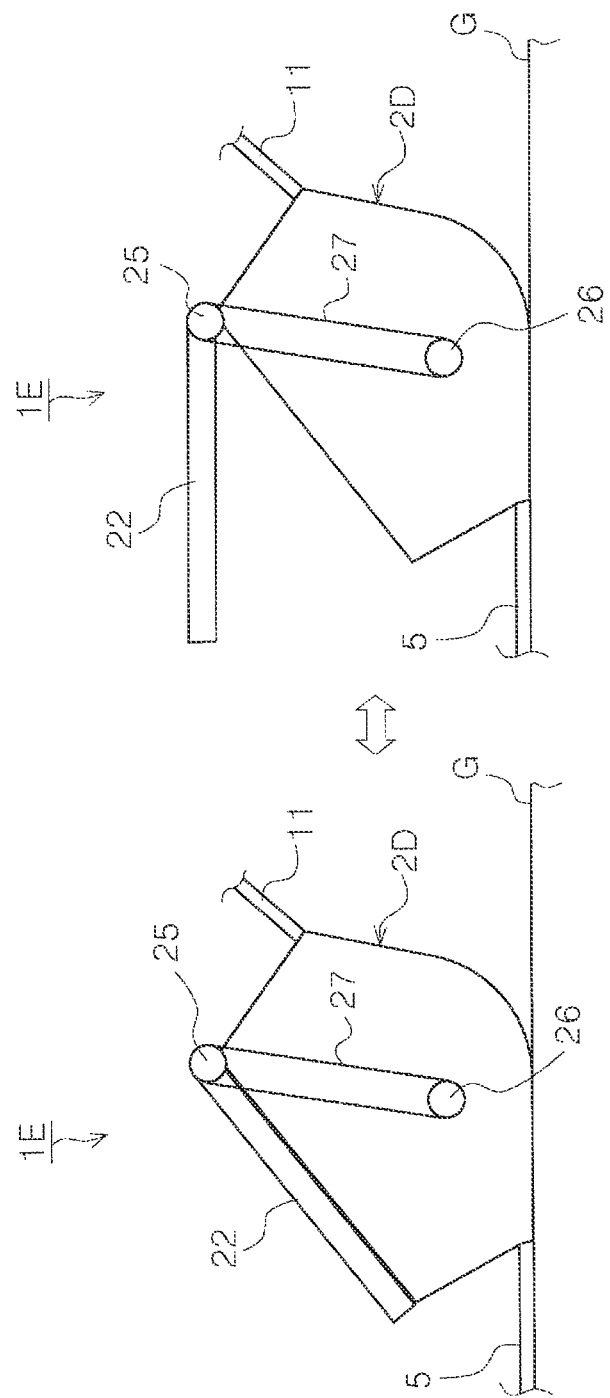
FIG. 11 includes side views each illustrating a scanner according to a fifth embodiment of the invention.

As another embodiment in which the mounting table 22 can switch the posture, a configuration illustrated in FIG. 11 may be adopted. A scanner 1E illustrated in FIG. 11 includes, inside a main body 2D, a drive pulley 26 driven by a non-illustrated motor. A slave pulley 25 is provided on the mounting table 22, and a belt 27 is wound around the slave pulley 25 and the drive pulley 26. When the drive pulley 26 rotates, the slave pulley 25 is made to rotate so as to change the posture of the mounting table 22 from the right drawing in FIG. 11 to the left drawing in FIG. 11, or vice versa.

Figure 12:
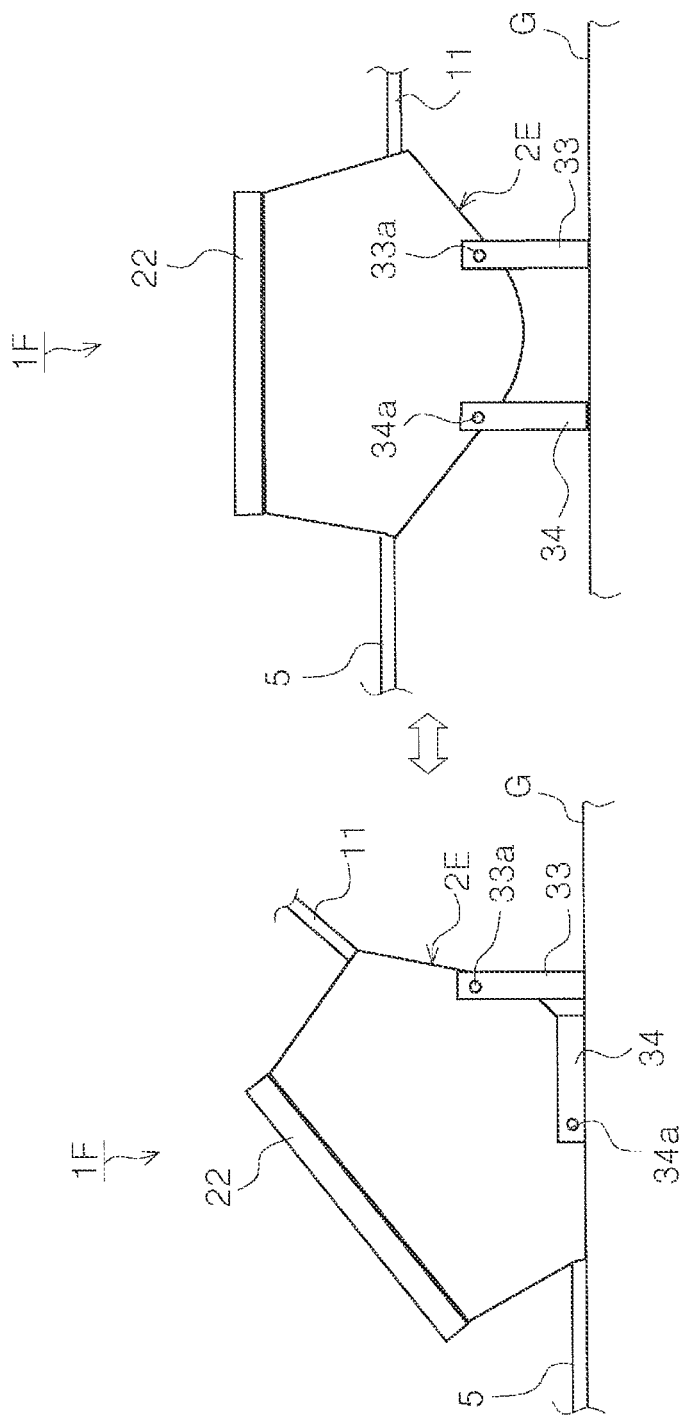
FIG. 12 includes side views each illustrating a scanner according to a sixth embodiment of the invention.

A scanner 1F according to a fifth embodiment illustrated in FIG. 12 includes support legs 33 and 34 located on the bottom face of a main body 2E. The support legs 33 and 34 are attached so as to pivot about fulcrums 33a and 34a, respectively, and the posture of the main body 2E with respect to the installation base G can be switched by the pivoting of the support legs 33 and 34 from the right drawing in FIG. 12 to the left drawing in FIG. 12, or vice versa.

Figure 13:
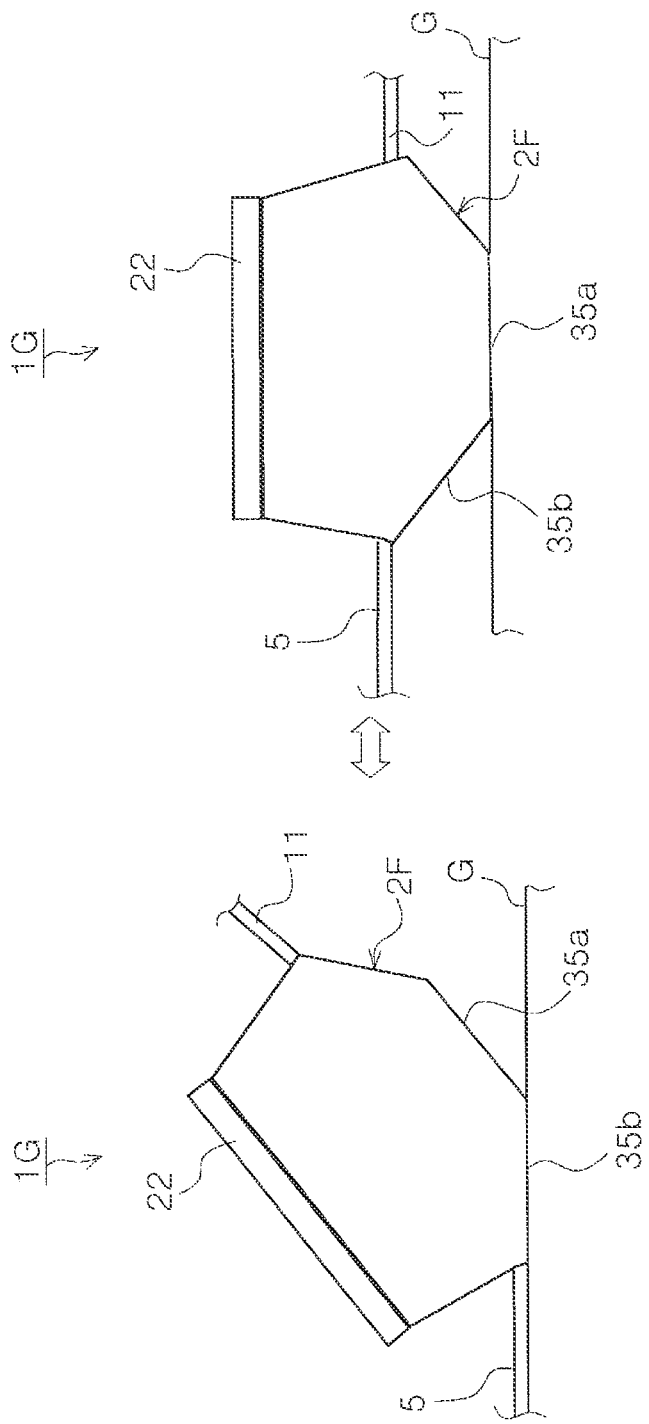
FIG. 13 includes side views each illustrating a scanner according to a seventh embodiment of the invention.

Further, a scanner 1G according to a sixth embodiment illustrated in FIG. 13 includes bottom faces 35a and 35b, located on the bottom portion of a main body 2F. The bottom faces 35a and 35b are each formed as a planar surface so as to intersect at a predetermined angle. Switching the surface to make contact with the installation base G between the bottom faces 35a and 35b enables the posture of the main body 2F with respect to the installation base G to be switched from the right drawing in FIG. 13 to the left drawing in FIG. 13, or vice versa.

Figure 14:
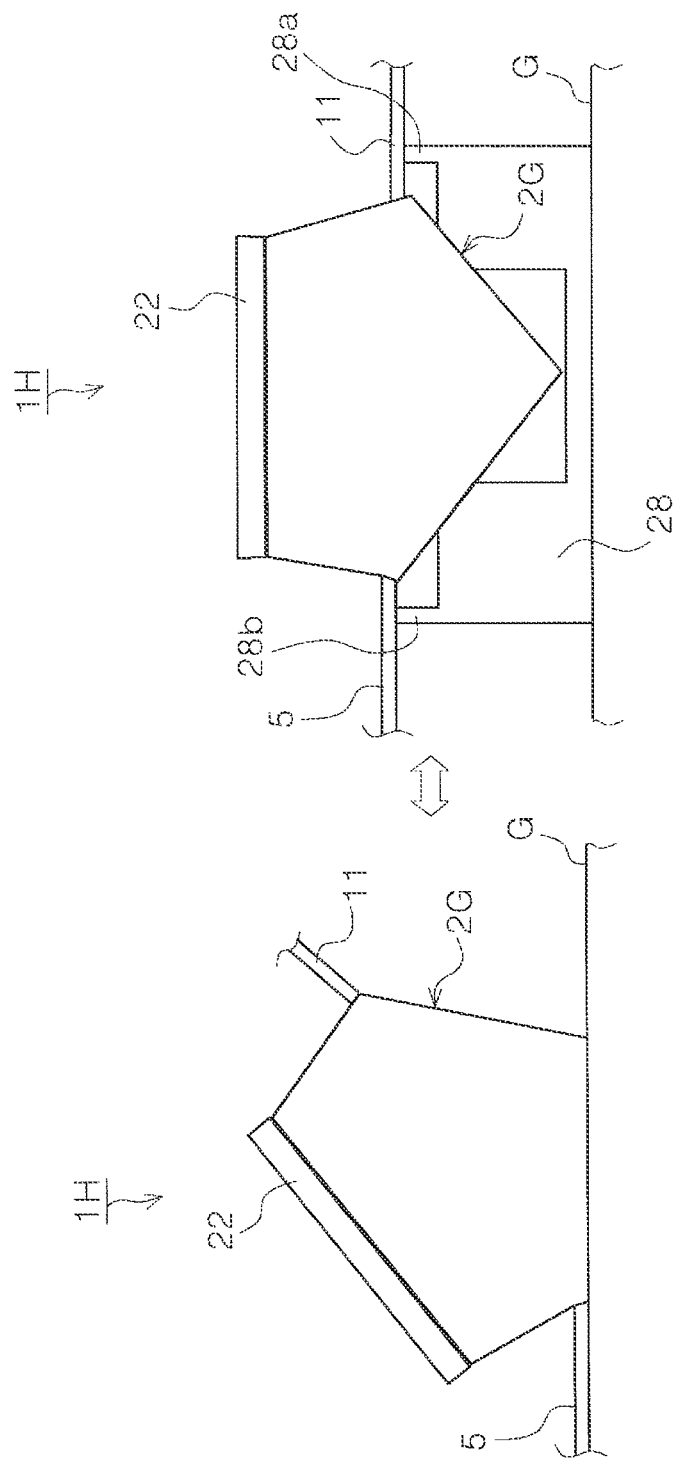
FIG. 14 includes side views each illustrating a scanner according to an eighth embodiment of the invention.
Figure 15:
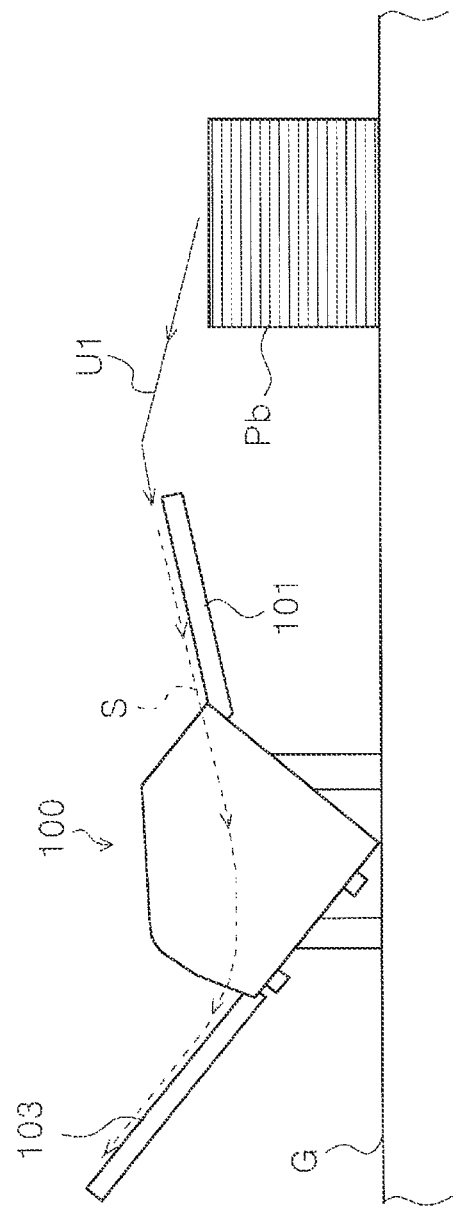
FIG. 15 is a schematic drawing illustrating a motion line of a user's hand, when a scanner of the related art is used.

Still further, in a scanner 1H according to a seventh embodiment illustrated in FIG. 14, a main body 2G is supported by a pedestal 28. The pedestal 28 includes tray supporters 28a and 28b, which also support the document feed tray 11 and the discharge tray 5, respectively. Employing the pedestal 28 enables the posture of the main body 2G with respect to the installation base G to be switched from the right drawing in FIG. 14 to the left drawing in FIG. 14, or vice versa.

An advantage of some aspects of the embodiment disclosed herein is provision of an image reading apparatus that is more user-friendly to the user setting and scanning the source document.

In an aspect, the embodiment provides an image reading apparatus including a medium support section that supports a medium to be fed, a reading unit that performs reading on the medium fed from the medium support section, and a mounting section on which the medium to be set on the medium support section is mountable, the mounting section being located on an outer face of a main body including the reading unit.

The image reading apparatus according to the aspect includes the mounting section on which the medium to be set on the medium support section is mountable, and the mounting section is located on the outer face of the main body including the reading unit. Accordingly, the user can set the medium to be fed along an extremely short motion line of the hand, and therefore the work efficiency can be improved.

As an additional advantage, it is no longer necessary to ensure a space for placing the medium to be set, around the image reading apparatus.

In the image reading apparatus, the mounting section may include a wall portion opposed to at least a side of the medium to be mounted.

In this case, since the mounting section includes the wall portion opposed to at least a side of the medium to be mounted, the medium can be prevented or restricted from slipping off from the mounting section in a direction toward the wall portion.

In the image reading apparatus, the mounting section may be configured to receive a medium of an A4 size according to ISO 216.

In this case, the advantages described above can be attained, with the configuration in which the medium of the A4 size according to ISO 216 is mountable on the mounting section.

In the image reading apparatus, the mounting section may be configured to switch between postures with respect to the main body.

In this case, since the mounting section can switch between the postures with respect to the main body, the mounting section can be set to a posture that facilitates the medium to be mounted thereon.

In the image reading apparatus, the mounting section may be removably attached to the main body.

In this case, since the mounting section is removably attached to the main body, the overall size of the image reading apparatus can be made smaller, when it is unnecessary to use the mounting section.

The image reading apparatus may include an operation unit for executing operations of the apparatus, the operation unit being provided in the main body, and the operation unit may be configured to switch between a first position in which the operation unit is covered with the mounting section or the medium mounted on the mounting section, and a second position in which the operation unit is not covered with the mounting section or the medium mounted on the mounting section.

In this case, since the image reading apparatus includes the operation unit for executing the operations of the apparatus, the operation unit being provided in the main body, and the operation unit is configured to switch between the first position in which the operation unit is covered with the mounting section or the medium mounted on the mounting section and the second position in which the operation unit is not covered with the mounting section or the medium mounted on the mounting section, setting the operation unit to the second position enables the operation unit to be operated.

The image reading apparatus may include an operation unit for executing operations of the apparatus, the operation unit being provided in the main body, and the operation unit may be located on a face of the main body other than a face on which the mounting section is provided.

In this case, since the image reading apparatus includes the operation unit for executing the operations of the apparatus, the operation unit being provided in the main body, and the operation unit is located on the face of the main body other than the face on which the mounting section is provided, the operation unit can be kept from being covered with the mounting section and therefore the operability of the operation unit can be ensured.

The image reading apparatus may include an operation unit for executing operations of the apparatus, the operation unit being provided in the main body, and the operation unit may include a touch panel based on electrostatic capacitance.

In this case, since the image reading apparatus includes the operation unit for executing the operations of the apparatus, the operation unit being provided in the main body, and the operation unit includes the touch panel based on electrostatic capacitance, the touch panel can be prevented or restricted from reacting even if the mounted medium contacts the operation unit, and therefore an erroneous operation can be prevented or restricted.

The image reading apparatus may include an operation unit for executing operations of the apparatus, the operation unit being provided in the main body, and the main body may be configured to switch between postures with respect to an installation base on which the main body is installed. The image reading apparatus may further include a controller that controls operations of the apparatus, the controller being configured to invalidate an instruction inputted through the operation unit, when the main body assumes a posture that allows the medium to be mounted on the mounting section.

In this case, the main body is configured to switch between the postures with respect to the installation base on which the main body is installed, and the controller that controls the operations of the apparatus is configured to invalidate the instruction inputted through the operation unit, when the main body assumes the posture that allows the medium to be mounted on the mounting section. Therefore, the operation unit can be prevented from being erroneously operated, when the mounting section is in use.

In the image reading apparatus, the main body may be configured to switch between postures with respect to an installation base on which the main body is installed. The image reading apparatus may further include a controller that controls operations of the apparatus, a posture detector that detects the posture of the main body, a medium detector that detects whether the medium is present on the medium support section. The controller may be configured to perform a normal feed mode including finishing a feed job upon detecting, based on a detection signal from the medium detector, that a last medium on the medium support section has been fed, and a standby feed mode including temporarily suspending the feed job upon detecting, based on a detection signal from the medium detector, that a last medium on the medium support section has been fed, entering a standby state until a next medium is mounted on the medium support section, and resuming the feed job when the next medium is mounted on the medium support section, and switch between the normal feed mode and the standby feed mode, based on detection information from the posture detector.

The above configuration improves the user-friendliness of the apparatus, in the case where the user repeats the operation including picking up the medium from the mounting section, and setting the medium on the medium support section, to feed and scan the medium.

What is claimed is:

1. An image reading apparatus comprising:
a main body;
a touch panel that is provided on an upper side of the main body and operates execution of image reading;
a document transport path provided in the main body and in which a source document is transported in a transport direction;
a feed tray that is located at an upstream end of the document transport path in the transport direction and supports a source document to be fed;
a feed roller that is provided downstream of the feed tray in the transport direction and feeds the source document supported on the feed tray;
a separation unit that is provided downstream of the feed tray in the transport direction and separates the source document that has been fed by the feed roller;
a reader that is provided downstream of the separation unit in the transport direction and performs reading on the source document that has been separated by the separation unit;
a discharge roller that is provided downstream of the reader in the transport direction and discharges the source document that has been read by the reader;
a discharge tray that is located at a downstream end of the document transport path in the transport direction, provided downstream of the reader in the transport direction and receives the source document that has been discharged; and
a mounting table that is provided on an upper side of the main body and includes an upper surface, the mounting table being located at an outer face of the main body, the upper surface serves as a mounting surface on which the source document to be fed or the source document that has been read is mounted, the mounting surface being located at a position higher than an upstream end of the feed tray when the source document is mounted on the mounting surface.

2. The image reading apparatus according to claim 1, wherein the mounting table includes a wall portion opposed to at least a side of the source document to be mounted.

3. The image reading apparatus according to claim 1, wherein the mounting table is configured to receive a source document of an A4 size according to ISO 216.

4. The image reading apparatus according to claim 1, wherein the mounting table is configured to switch between postures with respect to the main body.

5. The image reading apparatus according to claim 1, wherein the mounting table is removably attached to the main body.

6. The image reading apparatus according to claim 1, wherein the touch panel includes a touch panel based on electrostatic capacitance.

7. The image reading apparatus according to claim 1, wherein the touch panel is configured to switch between:
a first position in which the touch panel is covered with the mounting table or the source document mounted on the mounting table; and
a second position in which the touch panel is not covered with the mounting table or the source document mounted on the mounting table.

8. The image reading apparatus according to claim 1, wherein the touch panel is located on a face of the main body other than a face on which the mounting table is provided.

9. The image reading apparatus according to claim 1, wherein the touch panel is located on a face of the main body same as a face on which the mounting table is provided.

10. The image reading apparatus according to claim 1, wherein the feed tray is configured to rotate to the main body,
wherein the discharge tray is configured to rotate to the main body.

11. The image reading apparatus according to claim 1, further comprising
a pedestal that supports the main body;
wherein the main body is configured to rotate to the pedestal and control a posture for the pedestal.

12. The image reading apparatus according to claim 1, wherein the mounting surface is formed of an elastic material.

* * * * *